United States Patent [19]

Wilson, Jr.

[11] 4,208,458
[45] Jun. 17, 1980

[54] WELDING SPLATTER SHIELD

[76] Inventor: David F. Wilson, Jr., 1979 Sierra Madre Villa Ave., Pasadena, Calif. 91107

[21] Appl. No.: 17,493

[22] Filed: Mar. 5, 1979

[51] Int. Cl.² .............................................. B32B 3/04
[52] U.S. Cl. ...................................... 428/126; 15/241; 428/256
[58] Field of Search ............... 15/241, 248 R; 169/48; 228/59, 21; 428/77, 78, 80, 81, 83, 124, 126, 130, 256, 542

[56] References Cited

FOREIGN PATENT DOCUMENTS 1535693 12/1978 United Kingdom ..................... 428/256

Primary Examiner—William J. Van Balen
Attorney, Agent, or Firm—Donald D. Mon

[57] ABSTRACT

Welding splatter shield comprised of fire-resistant flexible sheet material such as fiber glass overlaid with a heat conducting metal mesh. The metal mesh may be secured around the edges of the sheet by sewn flanges and may overlay on both sides of the flexible panel if desired.

9 Claims, 2 Drawing Figures

WELDING SPLATTER SHIELD

BACKGROUND OF THE INVENTION

This invention relates to shields for use during welding processes and more particularly relates to a shield which captures splattered welding material.

Welding shields are used to prevent weld splatter from dropping on people or surfaces nearby. Conventionally, these shields are constructed of canvas or a like material which after a short period of time becomes unusable because of the damage caused by burns from the hot metal. Additionally the shields presently used do not provide any means for cooling and for capturing the molten welding splatter after it hits the shield.

SUMMARY OF THE INVENTION

The purpose of the present invention is to provide a welding shield or screen to provide protection from hot molten metal splattered during a welding process.

The present invention provides protection by collecting or catching molten metal splattered during a welding process and cooling it rapidly upon contact with the shield, whereby both to cool it quickly and protect the shield, and also to capture the splattered material. The shield is constructed of a flexible sheet or panel of fire-resistant material such as fiber glass over which a heat conducting thermal mesh is overlaid. The metal mesh is secured to the flexible panel by any convenient means, for example by stapling it directly to the sheet, or capturing it by sewing it into flanges. If desired the metal mesh can be provided on both sides of the flexible panel.

During a welding process the shield is placed in a position to catch any splattered molten metal. As molten metal falls on the shield it is caught by the metal mesh. Since the mesh is made of heat conducting metal it rapidly cools the molten metal, discouraging it from burning through the panel backing the mesh. The metal mesh in addition to cooling the molten metal captures it, because the metal flows around it while still molten. When it is cooled it is trapped. Thus as the molten metal splatters on the shield it is captured by the metal mesh, quickly cooled and prevented from bouncing off or burning through the flexible panel.

It is an object of the present invention to provide a welding shield which discourages molten metal from burning through the shield.

Another object of the present invention is to provide a welding shield which captures splattered molten metal.

Still another object of the present invention is to provide a welding shield which quickly cools the molten metal after it captures it.

Other objects, advantages and novel features of the invention will become apparent from the following detailed description of the invention when considered in conjunction with the accompanying drawings wherein like references numbers identify like parts throughout.

DESCRIPTION OF THE PREFERRED EMBODIMENT

Figure 1:
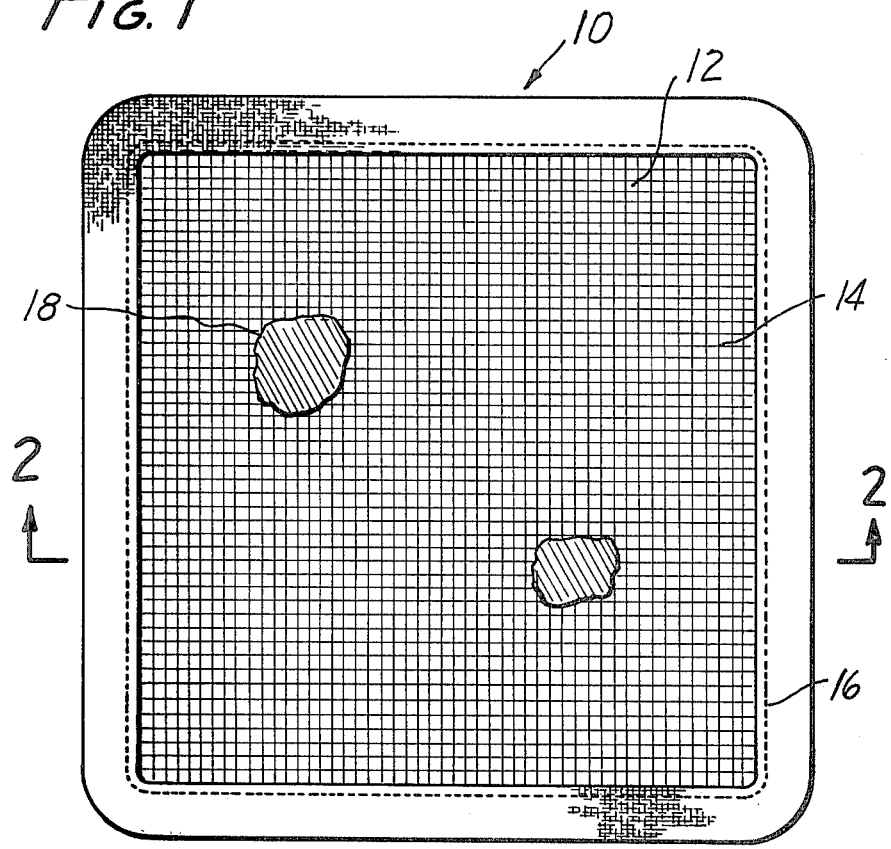
FIG. 1 is a top view of the welding shield.

The welding shield of the present invention is illustrated in FIG. 1 and is comprised of a flexible panel or sheet 12 overlaid with a metal mesh 14 secured by a peripheral flange 16. The metal mesh 14 may be secured to the flexible sheet 12 with fasteners such as staples or stitches over the general surface, or by sewing its edges into a peripheral flange 16 of the sheet material, or by adhesives.

Figure 2:
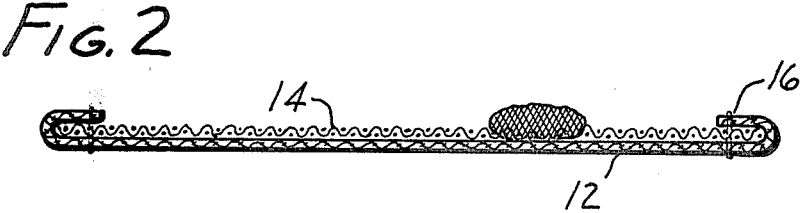
FIG. 2 is a sectional view of the welding shield of FIG. 1 taken at line 2—2 in FIG. 1.

As can be seen in FIG. 2, the flange 16 is formed by folding the flexible material 12 over the metal mesh 14 and sewing through the fold to secure the metal mesh 14.

The metal mesh 14 is an efficient heat-conducting metal such as copper, preferably plated with chromium, or stainless steel. A wire diameter of between about 0.008 and 0.011 inches appears to be most advantageous. The welding shield 10 can be constructed in a variety of sizes and shapes to fit the intended use. Additionally the metal mesh 14 could be provided on both sides of the flexible shield 12 in order to permit use of either side if desired.

The term "mesh" as used herein means a lattice of strands of material, comprehends overlaid patterns woven patterns, braided patterns, and even perforated sheets. The term connotes the existence of strands and open regions to receive and trap the splatter.

In use the shield is placed beneath or around a welding station to catch any splattered molten metal. A splotch of molten metal is illustrated at 18. It has fallen on the shield and become entangled or captured by the metal mesh 14. The good heat conductivity of the metal mesh 14 quickly dissipates the heat in the molten splotch 18 by conducting it away. This minimizes or prevents it from burning through the underlying panel or sheet 12.

This invention is not to be limited by the embodiments shown in the drawings and described in the description, which are given by way of example and not of limitation, but only in accordance with the scope of the appended claims.

I claim:

1. A shield for protecting against the splatter of material during a welding process comprising;
    a sheet of non-flammable material;
    a layer of metallic mesh overlaying and secured to said sheet of non-flammable material;
    said metallic mesh being comprised of thermally conductive material, whereby said metallic mesh cools molten metal dropped on said shield from a welding process.

2. The shield according to claim 1 wherein said non-flammable sheet is comprised of fiberglass.

3. The shield according to claim 1 wherein said fiberglass is coated with a heat resistant plastic.

4. The shield according to claim 1 wherein said layer of metallic mesh overlays both sides of said non-flammable sheet.

5. The shield according to claim 1 wherein said metallic mesh is attached to said non-flammable sheet by a peripheral stitched flange.

6. The shield according to claim 1 wherein said metallic mesh layer is comprised of copper.

7. The shield according to claim 1 wherein said metallic mesh layer is comprised of stainless steel.

8. The shield according to claim 6 wherein said non-flammable sheet is comprised of fiberglass.

9. The shield according to claim 7 wherein non-flammable sheet is comprised of fiberglass.

* * * * *